Oct. 31, 1967  H. NERWIN  3,349,682
ONE-PIECE EXPOSURE-CONTROLLING STRUCTURE
Filed Oct. 19, 1964
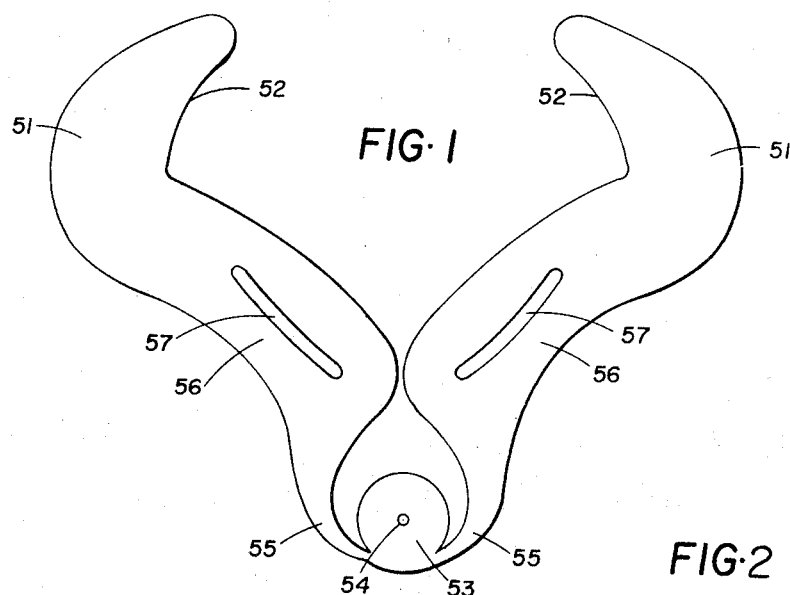
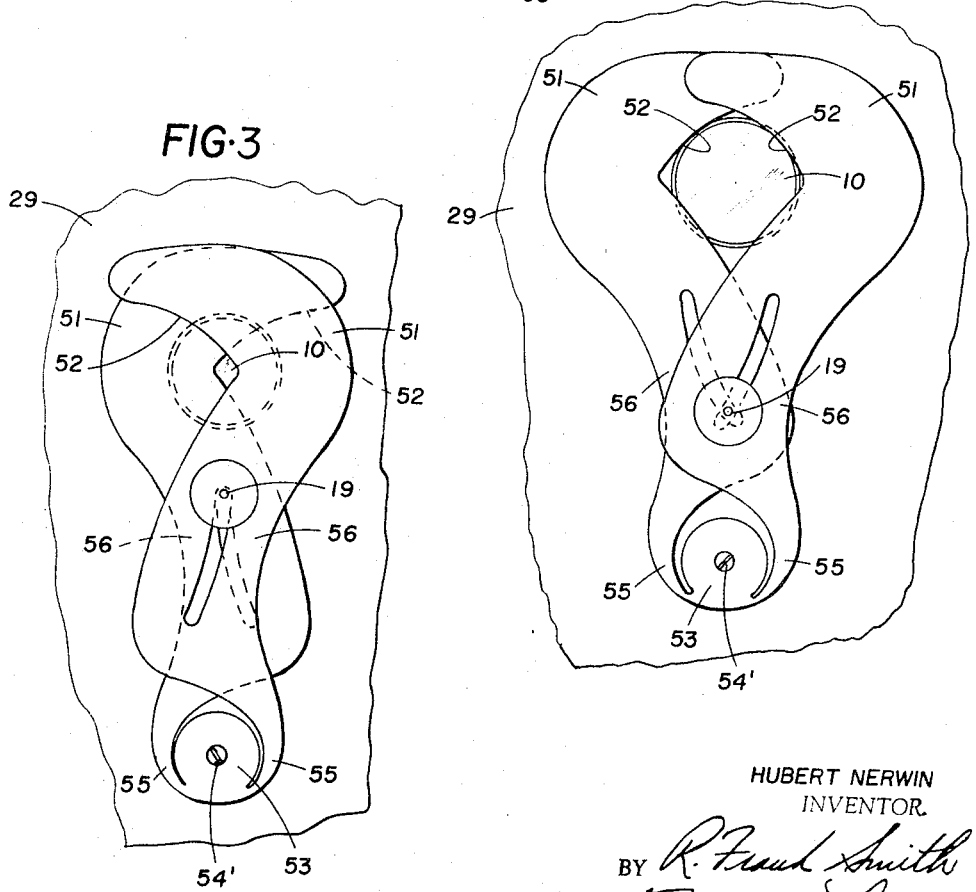
HUBERT NERWIN
INVENTOR.
BY R. Frank Smith
Morton Polster
ATTORNEYS

United States Patent Office 3,349,682
Patented Oct. 31, 1967

3,349,682
ONE-PIECE EXPOSURE-CONTROLLING STRUCTURE
Hubert Nerwin, Rochester, N.Y., assignor to Eastman Kodak Company, Rochester, N.Y., a corporation of New Jersey
Filed Oct. 19, 1964, Ser. No. 404,887
1 Claim. (Cl. 95—64)

ABSTRACT OF THE DISCLOSURE

A one-piece diaphragm having two blades each of which has a slot which is engageable with a pin. Movement of the pin with respect to the diaphragm mount changes the relative position of the two blades of the diaphragm in accordance with the position of the pin in the slot.

---

This invention relates to devices for controlling exposure in photographic cameras and, more particularly, to a simple, one-piece exposure-controlling structure which includes means for interconnecting the structure with the camera's photo-responsive system, as well as mounting and spring portions for resiliently supporting and driving its exposure-controlling portions.

In the automatic exposure control art, variable shutter-speed setting devices and adjustable single and multiple-vane diaphragms are well known. However, in the past it has been necessary to provide a separate mechanism, usually including several elements, to drive each exposure-regulating device, and pulleys, pins, or slots have been used to couple the vanes to each other so that they move in unison for changing the size of the lens aperture. Such automatically controlled systems usually include elements for biasing the shutter timing mechanism or the diaphragm vane to an initial position, an element for sensing the output of the camera's photo-responsive circuitry (e.g., a trapped galvanometer pointer), and also require further means interconnecting the sensing element and the exposure-regulating device to position the latter in accordance with the output of the camera's photo-responsive circuit.

The present invention has incorporated exposure-regulating diaphragm vanes as well as all of the various vane-controlling elements into a simple, one-piece structure. The structure is formed from a single piece of semi-rigid but flexible material having an extremely high fatigue resistance on flexing. Although the invention herein is not limited to any particular type of material, tests indicate that linear thermoplastic materials are superior to other basic materials, with over-all preference being given to polypropylene. By virtue of the unique one-piece structure disclosed herein, the camera's automatic exposure controlling system can be greatly simplified, since many elements previously required in the system may be omitted. Further, manufacture and assembly of the systems can be achieved with considerable economic savings.

Although the subject invention is described with particularity in terms of a unitary structure including diaphragm-forming vane portions, the novel one-piece structure disclosed herein may be used to position any exposure-controlling member, e.g., diaphragm rings, shutter speed controls, etc.

It is an object of this invention to provide a simple, economical one-piece structure for controlling exposure in cameras.

It is another object of this invention to provide a one-piece exposure-controlling structure including support portions, resilient bias portions, a portion for sensing the output of the camera's lighting condition indication means, as well as means for driving the exposure controlling portions of the structure.

It is a further object of this invention to provide a one-piece structure including a plurality of diaphragm-forming vanes, means for supporting said vanes and resiliently biasing them to an initial position, an element responsive to the output of the camera's lighting condition indication means, and means for driving said vanes to form an aperture determined in accordance with the output of said lighting condition indication means.

Further objects, purposes and characteristic features of the invention herein shall be in part apparent from the following description and in part obvious from the accompanying drawings of the invention in which reference characters having the same suffix refer throughout the several views of the various embodiments to elements having the same function, and in which:

FIGS. 1–3 illustrate a U-shaped one-piece exposure-controlling structure in accordance with the invention herein. Vane members 51 with their aperture forming edges 52 are oppositely disposed on the legs of said U-shaped structure, and are attached to mounting portion 53 by means of resiliently flexible portions 55 which act as springs to bias vane portions 51 to the position illustrated in FIG. 1.

Each drive portion 56 is contiguous with its respective vane portions 51 and respective slots 57 are designed to receive sensing member 19. FIG. 2 shows the unitary structure attached to camera mounting plate 29 by means of screw 54'. When in the condition illustrated in FIG. 2, sensing member 19 is in its initial limiting ("low light") position, and vane portions 51 are biased by resilient portions 55 to provide maximum aperture for camera lens 10. Prior to each exposure, sensing member 19 is moved upwardly to a position indicative of the output of the camera's photoresponsive system, thereby driving vanes 51 into greater overlapping relationship and reducing the aperture masking lens 10. Following the exposure of each successive frame, sensing member 19 is returned to its initial limiting position and the vanes 51 are biased to their fully open position by the spring action of connecting portions 55, as illustrated in FIG. 2.

Having explained the invention herein, it should be understood that the embodiment described above has been selected to facilitate understanding the invention and not to limit the number of forms the invention may take. Various alterations and modifications of the embodiment shown may be made to meet the requirements of practice without in any way departing from the spirit and scope of the invention herein as defined in the following claim.

What is claimed is:
In a camera having a picture-taking axis along which film-exposing light is received, and having at least one movable element positionable in accordance with the intensity of scene luminance, the improvement comprising:
  a one-piece exposure controlling structure of semi-rigid material, said structure comprising a mounting portion being attached to said camera to support said unitary structure therein,
  a pair of aperture-forming vanes positioned to regulate light passing along said axis,
  a pair of resiliently flexible portions for biasing each said vane toward a predetermined limiting position, and at least one drive portion coupled to said movable element for movement therewith, said vanes being driven against said bias to any one of a plurality of positions in response to the movement of said drive portion, whereby the aperture formed by said vane varies as a function of scene lumi- nance, said structure being formed in a general U-shape and said aperture-forming vanes being oppositely disposed on the legs of said U-shaped structure, and wherein said drive portion is comprised of two oppositely disposed members contiguous to each said vane, each said drive member being formed with a slot therein for receiving said movable element when said drive members are placed in overlapping relationship.

References Cited

UNITED STATES PATENTS

| 2,206,086 | 7/1940 | Galyon | 95—64 |
| 3,205,569 | 9/1965 | Nerwin et al. | 95—64 X |
| 3,253,523 | 5/1966 | Hutchinson | 95—64 X |

NORTON ANSHER, *Primary Examiner.*

J. F. PETERS, *Assistant Examiner.*